United States Patent [19]

Tongret

[11] 4,244,712
[45] Jan. 13, 1981

[54] CLEANSING SYSTEM USING TREATED RECIRCULATING AIR

[76] Inventor: Stewart R. Tongret, 827 17th St., Santa Monica, Calif. 90403

[21] Appl. No.: 17,451

[22] Filed: Mar. 5, 1979

[51] Int. Cl.³ .................. B01D 35/06; B03C 3/32; B03C 3/04
[52] U.S. Cl. .................. 55/124; 55/271; 55/279; 55/470; 422/121
[58] Field of Search .......... 55/139, 279, 124, 138, 55/470, 136, 271, 316, 387; 422/121

[56] References Cited

U.S. PATENT DOCUMENTS

| | | | |
|---|---|---|---|
| 2,886,124 | 5/1959 | Scharmer | 55/470 |
| 3,071,828 | 1/1963 | Cornell, Jr. | 55/279 |
| 3,172,747 | 3/1965 | Nodolf | 55/124 |
| 3,347,025 | 10/1967 | Wiley | 422/121 |
| 3,722,182 | 3/1973 | Gilbertson | 55/124 |
| 3,745,750 | 7/1973 | Arff | 55/124 |
| 3,747,300 | 7/1973 | Knudson | 55/138 |
| 3,804,942 | 4/1974 | Kato et al. | 55/138 |
| 3,824,770 | 7/1974 | Eckstein | 55/279 |
| 3,981,695 | 9/1976 | Fuchs | 55/138 |
| 3,988,131 | 10/1976 | Kanazawa et al. | 55/124 |
| 4,133,652 | 1/1979 | Ishikawa et al. | 55/138 |

*Primary Examiner*—Frank W. Lutter
*Assistant Examiner*—Gregory N. Clements
*Attorney, Agent, or Firm*—Ralph B. Pastoriza

[57] ABSTRACT

The system comprises a portable housing having air entrance and air exit openings. A motor connected to a timer operates blowers in the housing to draw air into the entrance openings and through the housing out the exit openings. The housing incorporates an electrostatic air cleaner, a charcoal filter, an ozone gas generator and a negative ion generator to provide treated air having ozone and negative ions and wherein the electrostatic cleaner and charcoal filter physically and chemically remove impurities. This air circulates about an area in which the housing is positioned, the air penetrating and permeating fabric, carpets, rugs and the like in the area to kill odor causing bacteria and essentially sanitize material with which the air comes into contact. A specific application is that of deodorizing and sanitizing the interior of rental automobiles.

1 Claim, 5 Drawing Figures

CLEANSING SYSTEM USING TREATED RECIRCULATING AIR

This invention relates generally to deodorizing and cleansing systems and more particularly to a portable system using treated recirculating air to effect deodorization and sanitization.

BACKGROUND OF THE INVENTION

Air filtering systems, in general, are well known in the art and are widely used in air conditioning systems in both home and industrial areas. While such systems are effective in removing particulate impurities from the air, they will not necessarily remove odors. The problem is particularly acute in homes and automobiles wherein unpleasant odors result from stale tobacco smoke, body perspiration and the like.

In general, the problem of removing odors has been accomplished by simply "masking" the odors with various types of sprays. However, such treatment is essentially the substitution of one odor for another and after the "masking" treatment wears off there can still result the basic obnoxious type odors. In fairly confined areas such as an automobile, such odors are generally the result of bacteria from human perspiration and the like and permeate throughout the seat fabric, carpets, and other absorbent materials in the interior of the automobile. In the case of automobile rental agencies wherein good business practices dictate an odor free, clean automobile for each new customer, there is a real need for an appropriate deodorizing and sanitizing system for treating each car upon its return preparatory to use by a next customer.

BRIEF DESCRIPTION OF THE PRESENT INVENTION

Bearing the foregoing considerations in mind, the present invention contemplates the provision of a portable cleansing system using treated recirculating air wherein the air itself is treated and recirculated so as to penetrate and permeate fabric, carpets, rugs and the like in an area within which the unit is positioned to kill odor causing bacteria and essentially sanitize material with which the air comes into contact. Thus, rather than "masking", the system of the present invention actually removes the root cause of the odors.

Basically, I have discovered that by combining a series of different treatments to circulating air, the foregoing desirable deodorizing and cleansing can be readily accomplished in a fairly short period of time. Towards this end, the preferred form of my invention includes a housing having air entrance and exit openings and incorporating a blower means for drawing air into the entrance opening, through the housing and out the exit opening. The housing itself incorporates an electrostatic air cleaner, a charcoal filter, an ozone gas generator and a negative ion generator. The air moving through the housing is caused to pass successively through the electrostatic air filter, the charcoal filter, the ozone gas generator and thence the blower. The negative ion generator is disposed between the outlet of the blower and the exit openings in the housing so that the air flowing out the exit openings is provided with negative ions.

An appropriate timer is provided to operate the blower and other active units for a given set period sufficient to deodorize and cleanse a given area within which the unit is positioned.

BRIEF DESCRIPTION OF THE DRAWINGS

A better understanding of this invention will be had by now referring to the accompanying drawings in which.

DETAILED DESCRIPTION OF THE PREFERRED EMBODIMENT

Figure 1:
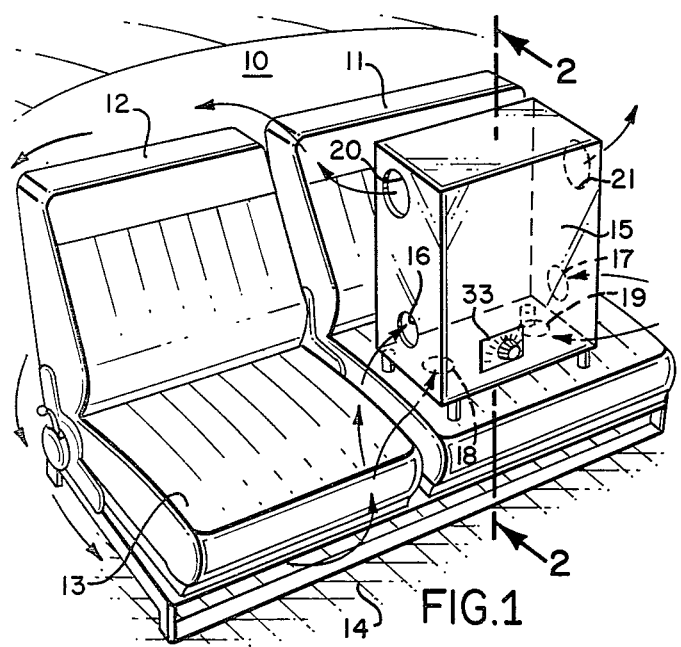
FIG. 1 is a fragmentary perspective view of the interior of an automobile in which a preferred embodiment of the cleansing system of this invention is shown in operation.

Referring first to FIG. 1, there is illustrated as one example of an environment in which the present invention might be used, the interior of an automobile 10 having seats 11 and 12. Such seats may include fabric material such as indicated at 13 and generally the interior of the car will be carpeted such as indicated at 14.

The system of the present invention is embodied in a basic housing 15 essentially portable such that it can be positioned on the automobile seat as shown. Housing 15 includes air entrance openings such as indicated at 16, 17, 18 and 19 in its lower portion, and air exit openings indicated at 20 and 21. These air exit openings are formed in opposite walls of the housing 15 in offset relationship for reasons that will become clearer as the description proceeds.

Figure 2:
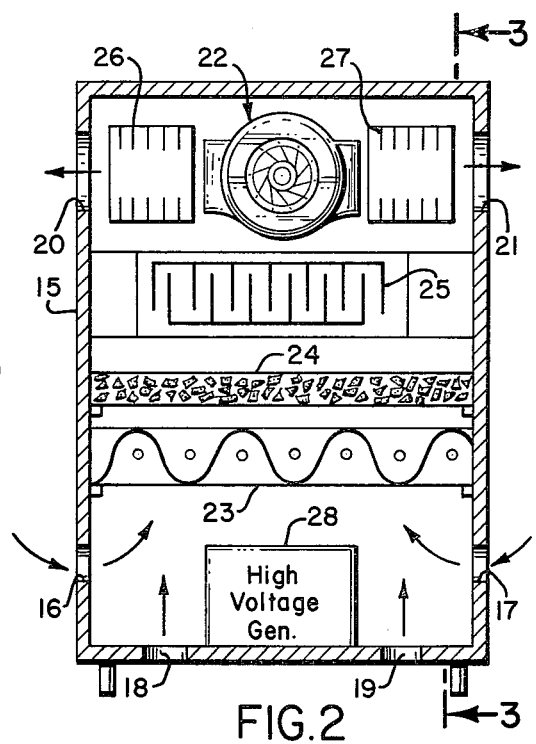
FIG. 2 is a cross section diagramatic in form illustrating the basic components incorporated in the system looking in the direction of the arrows 2—2 of FIG. 1.

Referring now to the cross section of FIG. 2, the basic components making up the system within the housing 15 include a blower means designated generally by the arrow 22 adjacent to the exit openings 20 and 21. The lower interior of the housing immediately above the air entrance openings includes an electrostatic air cleaner 23 followed by a charcoal filter 24.

Air flow through the housing is indicated by the arrows and it will be noted that air first passes through the electrostatic air cleaner 23. As will be described subsequently, this electrostatic air cleaner is charged with positive high voltage and serves to filter out negatively charged impurities in the air. The charcoal filter 24 through which the air next passes chemically absorbs other impurities in the air.

Referring to the upper central portion of the interior of the housing 15 in FIG. 2, after the air passes through the charcoal filter 24 it continues through an ozone gas generator 25 which supplies ozone to the air. The ozone treated air is then passed through the blower means 22 and finally through negative ion generators schematically depicted at 26 and 27. The negative ion generators are positioned at the output of the blower means to add negative ions to the air prior to passing out the exit openings. High voltage for the ozone generator 25 is provided from a high voltage generator 28 shown in the lower central portion of the housing 15. Positive and negative high voltages in turn are derived from this high voltage generator for connection to the electrostatic cleaner 23 and the negative ion generators 26 and 27 after being rectified.

Referring once again to FIG. 1, the various arrows indicate the circulating air about the interior area of the automobile. This air, as mentioned, will penetrate and permeate the fabric 13 of the seats, the carpet, other upholstery linings, and the like in the car to kill odor-causing bacteria and essentially sanitize material with which the air comes into contact. In this respect, the ozone oxydizes bacteria to kill the same which eliminates odors. The negatively charged ions attract impurities and the like and when recirculated through the housing, such particulate charged particles are precipitated out by the electrostatic screen 23.

Figure 3:
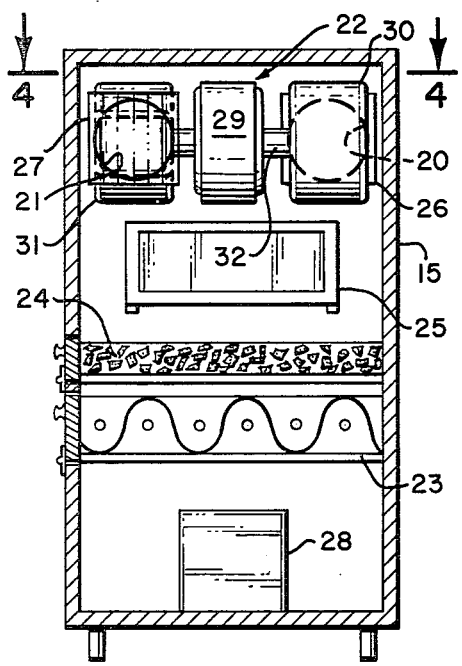
FIG. 3 is another cross section taken in the direction of the arrows 3—3 of FIG. 2.
Figure 4:
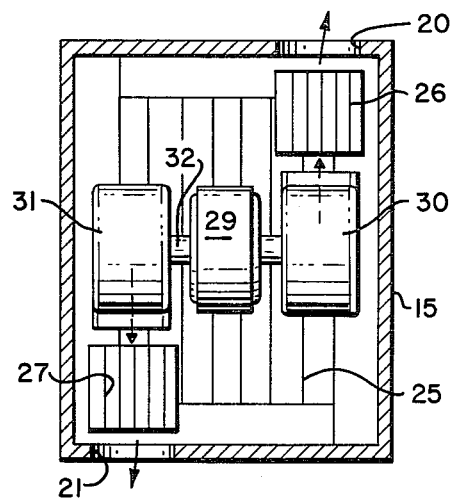
FIG. 4 is a top cross section taken in the direction of the arrows 4—4 of FIG. 3.

The preferred arrangement of the blower means can better be understood with reference to the cross sections of FIGS. 3 and 4 wherein the blower means includes a blower motor 29 having centrifugal type blowers 30 and 31 connected to opposite ends of the motor shaft 32 as shown. This particular packaging for the blower means is best illustrated in FIG. 4 wherein the positioning of the negative ion generators 26 and 27 adjacent to the exit openings 20 and 21 respectively relative to the centrifugal blowers 30 and 31 will be clear.

It will be understood that the housing 15 may include appropriate side door openings for permitting removal and cleaning of the electrostatic cleaner 23 and charcoal filter 24.

Figure 5:
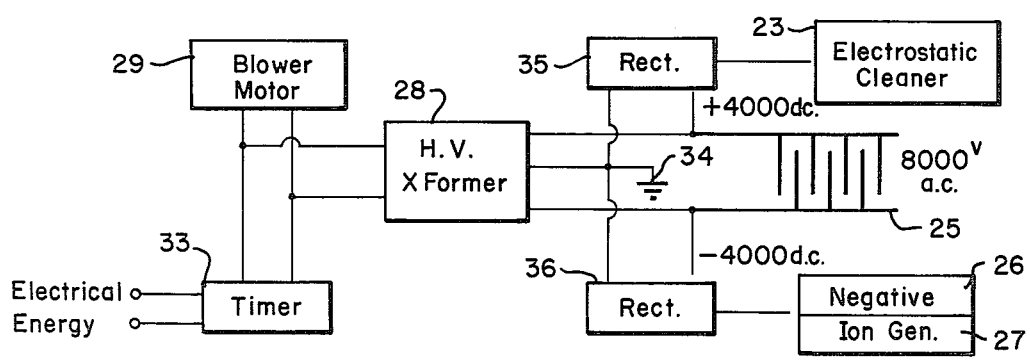
FIG. 5 is a schematic block diagram of the basic electrical circuit for the system.

FIG. 5 is a block diagram of the basic energizing system for the active components described in connection with FIGS. 1 through 4.

Referring to the lower left portion of FIG. 5, there is shown a timer 33 having input terminals for receiving electrical energy. This energy may be supplied from a conventional 110-volt 60-cycle outlet or, alternatively, from the normal battery voltage available at a cigarette lighter in an automobile wherein an appropriate converter is used. The timer 33 includes an on/off switch and essentially will supply electrical energy to the unit for a given set time period. Towards this end, an adjustable control for the timer designated 33 is illustrated on the lower exterior wall of the housing 15 as illustrated in FIG. 1.

The output from the timer connects through appropriate leads to the blower motor 29 and to the heretofore referred to high voltage transformer 28.

The secondary output from the high voltage transformer is centertapped to ground as indicated at 34, there being provided 8,000 volts of a.c. energy across the secondary output coil leads. This 8,000 volts is applied directly to the ozone generator 25 as shown.

Appropriate rectifiers 35 and 36, in turn, connect across the output leads and center tap respectively to provide a + and −4,000 volt d.c. energy to the electrostatic cleaner 23 and to the negative ion generators 26 and 27, respectively.

In operation, the portability of the unit permits its use in many varied types of areas. In a fairly confined environment such as an automobile, it is found that the timer need only be set for twenty minutes to effect a complete deodorizing and sanitizing operation. When so used in an automobile, the automobile battery energy can be provided by way of the cigarette lighter, it being understood, as mentioned, that an appropriate converter would be used.

For home use, the unit can simply be plugged into any conventional 110-volt a.c. outlet.

An important feature of this invention is the fact that ozone is generated inside the same chamber through which the circulating air is pumped. If the ozone were generated outside the chamber and pumped into the chamber, the effect of the ozone on the atmosphere would be fractional compared to putting the ozone generator in the chamber itself where the atmosphere is pumped through. The advantage of having the ozone generator in the chamber is the fact that the recirculating air is pumped through a several hundred degree temperature plasma in the ozone generator itself. This high temperature is very destructive of bacteria and certainly more destructive than is the case with ozone-treated air at ambient temperature.

It will further be understood that if smoke remains suspended because it is positively charged, the negative ions will dissipate the charge and allow particles to combine and heavier combined particles will settle or, as they are recirculated, will be collected by the filter.

If smoke particles are not charged at all, the negative ions will charge the neutral particles as they are recirculated at a high rate through the positively charged screen filter where they will attach and be collected.

Aside from the beneficial effects of ozone in combatting bacteria, the ozone itself will convert common odor chemicals to less volatile species which can be more easily adsorbed in charcoal and which inherently have less of an odor. In other words, ozone reacts with characteristic ingredients of unpleasant chemical odors such as tobacco, spoiled food, mildew, etc. As an example, aldehydes are converted to fatty acids, amines to amides or amine oxides, mercaptans to sulphinic acids and non-saturated hydro carbons to ozonides.

A very constructive result thus occurs when the electrostatic cleaner, charcoal filter, ozone generator and negative ion generators are all utilized in the combination described. More particularly, the capability of the system to deodorize and cleanse in a relatively short period of time constitutes a surprising and unexpected result. Not only is the air itself purified by the system but the treated air constitutes the actual deodorizing and cleansing agent in that it permeates all objects with which it comes into contact killing odor causing bacteria and the like thereby removing the root cause of such odors.

I claim:

1. A cleansing system using treated recirculating air including, in combination:
   (a) a housing having an air entrance opening and first and second air exit openings on opposite sides of the housing respectively;
   (b) blower means including a blower motor having a shaft with two centrifugal type blowers mounted on opposite sides of said shaft juxtaposed to said first and second exit openings, respectively, for drawing air into the entrance opening and through the housing out the exit openings;
   (c) an electrostatic air cleaner supported in said housing through which incoming air passes for filtering out negatively charged impurities in the air;
   (d) a charcoal filter in said housing following said electrostatic air cleaner for chemically absorbing other impurities in said air;
   (e) an ozone gas generator following said charcoal filter for adding ozone to air flowing through said housing;
   (f) first and second negative ion generators associated with said first and second exit openings respectively for charging air particles negatively, said blower means following said ozone gas generator and preceding said negative ion generators so that air flowing out said exit openings contains ozone and is treated with negative ions at the output of said blower means immediately prior to passing through said exit openings;

(g) a timer attached to said housing for supplying electrical energy during a set time period to said blower means, electrostatic air cleaner and negative ion generator;

(h) a high voltage transformer in said housing connected to said timer and including a grounded center tapped secondary coil providing high voltage A.C. on first and second output leads connected to said ozone generator; and, (i) first and second rectifiers connected respectively between said output leads and said center tapped ground for providing rectified positive and negative voltages, equal to one half the total output voltage of said high voltage transformer to said electrostatic air cleaner and said negative ion generators respectively, said air circulating around an area in which said housing is positioned and penetrating and permeating fabric, rugs, carpets and the like in said area to kill odor causing bacteria and essentially sanitize material with which the air comes into contact.

* * * * *